United States Patent [19]

Marietta

[11] Patent Number: 5,282,655
[45] Date of Patent: Feb. 1, 1994

[54] MECHANICALLY LOCKED WELLHEAD CONNECTOR

[75] Inventor: Dale B. Marietta, Singapore, Singapore

[73] Assignee: ABB Vetco Gray Inc., Houston, Tex.

[21] Appl. No.: 34,013

[22] Filed: Mar. 22, 1993

[51] Int. Cl.⁵ ............................................. F16L 37/18
[52] U.S. Cl. ..................................... 285/315; 285/39; 285/320; 285/330; 29/428
[58] Field of Search ................. 285/315, 320, 39, 330; 166/344, 345; 29/428

[56] References Cited

U.S. PATENT DOCUMENTS

| | | | |
|---|---|---|---|
| 1,910,706 | 5/1933 | Malzard | 285/320 X |
| 4,191,406 | 3/1980 | Eaton | 285/315 X |
| 4,522,430 | 6/1985 | Stromberg | 285/315 X |
| 4,790,571 | 12/1988 | Montanari | 285/315 X |
| 4,893,842 | 1/1990 | Brommer | 285/315 X |

FOREIGN PATENT DOCUMENTS 1155913 6/1964 United Kingdom ............... 285/320

Primary Examiner—Dave W. Arola
Attorney, Agent, or Firm—James E. Bradley

[57] ABSTRACT

A connector assembly connects a hub connector to a wellhead housing by utilizing a collet. The collet has an upper internal projection that engages the hub connector and a lower internal projection that engages the flange on the wellhead housing. An actuator ring moves the collet from an unlocked to a locked position, the actuator ring moving axially. A drive nut, when rotated, will move the actuator ring downward. Load screws extending through the drive nut force the actuator ring further downward after the drive nut has reached its lower position. Release pins extending through the actuator ring, when rotated inward, will pry against a release surface to move the actuator ring upward relative to the drive nut.

17 Claims, 2 Drawing Sheets

MECHANICALLY LOCKED WELLHEAD CONNECTOR

BACKGROUND OF THE INVENTION

1. Field of the invention

This invention relates in general to devices for connecting two tubular members together, and in particular to a mechanically locked wellhead connector.

2. Description of the Prior Art

In the oil industry, a well will commonly have a wellhead housing extending upward from the well. Pressure control equipment during drilling, or a christmas tree after drilling, mounts to the upper end of the wellhead housing. A wellhead connector will connect the pressure control equipment or tree to the wellhead housing.

Typically, the wellhead housing has an upper rim and a seal seat located at the upper rim. The wellhead connector body has a rim that abuts the rim of the wellhead housing. The seal seals between the hub connector body and the wellhead housing. Generally, the wellhead connector for use during drilling is large and hydraulically actuated. A piston when supplied with fluid will move a cam or actuator sleeve downward, forcing dogs into grooves formed on the wellhead housing. The wellhead connector for production need not be as large. Some utilize clamps without the need for hydraulic actuation. Others are hydraulically actuated, similar to the type used for drilling. While the prior art connectors serve sufficiently well, improvements in simplicity, size and ease of installation are desirable.

SUMMARY OF THE INVENTION

In this invention, the wellhead connector includes a collet which comprises a plurality of separate dog ring segments. The wellhead connector and wellhead abut each other, with the wellhead connector being an upper tubular member and the wellhead a lower tubular member. Each has a flange. The collet has an upper internal projection that engages the upper flange and a lower internal projection that engages the lower flange.

An actuating ring moves axially, forcing the lower end of the collet into engagement with the lower flange. The actuating ring is driven downward by a rotatable drive nut. The drive nut is threaded to the upper tubular member. Load pins extend through the drive nut for engaging an upper side of the actuating ring. Once the drive nut is in the lower position, the load pins are rotated downward relative to the drive nut, pushing the actuating ring to the lower position.

Threaded release pins extend radially through the actuating ring for engagement with a tapered shoulder on the collet. Rotating the release pins inward wedges the actuating ring upward. This frees the drive nut to be rotated upward to release the collet from the lower tubular member.

DETAILED DESCRIPTION OF THE INVENTION

Figure 1:
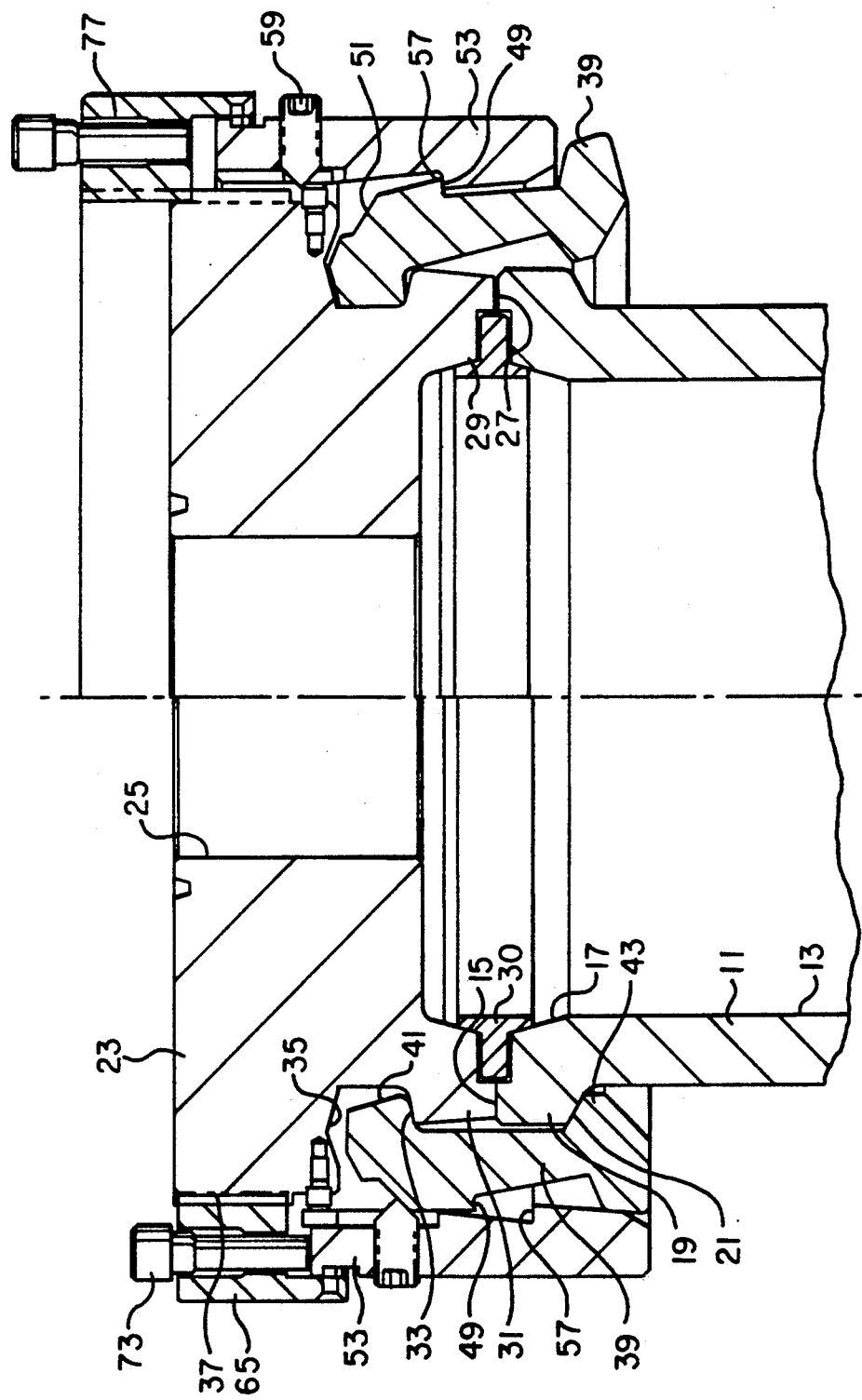
FIG. 1 is a vertical sectional view of a wellhead connector constructed in accordance with this invention, with the right side showing the assembly in a locked position on a wellhead housing, and the left side showing the assembly in an unlocked position on the wellhead housing.

Referring to FIG. 1, wellhead housing 11 is conventional. It is a large lower tubular member that extends vertically upward from the well. Wellhead housing 11 may be located at the surface, or it may be subsea. Wellhead housing 11 has an axial bore 13. A rim 15 is located at the upper end of wellhead housing 11. A tapered seat 17 extends around the inner diameter of rim 15. An external flange 19 extends radially outward from rim 15. Wellhead flange 19 defines a downward and outward facing conical shoulder 21.

A wellhead or hub connector 23 connects to the wellhead housing 11. Hub connector 23 is an upper tubular member having an axial bore 25 that is coaxial with bore 13 but of a smaller diameter in the embodiment shown. In the embodiment shown, a christmas tree (not shown) will bolt to hub connector 23 through bolt holes (not shown) extending into hub connector 23. Hub connector 23 has a downward facing rim 27 that abuts wellhead housing rim 15. Hub connector 23 has a conical seat 29 at rim 27. A seal 30 seals between seats 17 and 29.

A flange 31 locates at rim 27. Flange 31 projects radially outward, defining an upward facing shoulder 33. A generally concave downward facing shoulder 35 locates above shoulder 33, defining an annular recess between shoulders 33 and 35. Hub connector 23 has external threads 37 located above upper shoulder 35. Threads 37 are preferably of a multi-start type.

A collet connects wellhead housing 11 to hub connector 23. The collet comprises a plurality of dog ring segments 39. Segments 39 are individual arcuate members that when placed around flange 31 make up a segmented ring. Dog ring segments 39 have upper internal projections 41 and lower internal projections 43. Upper internal projections 41 extend into the recess between shoulders 33, 35. Lower projections 43 extend into engagement with shoulder 21 of wellhead housing flange 19.

Figure 2:
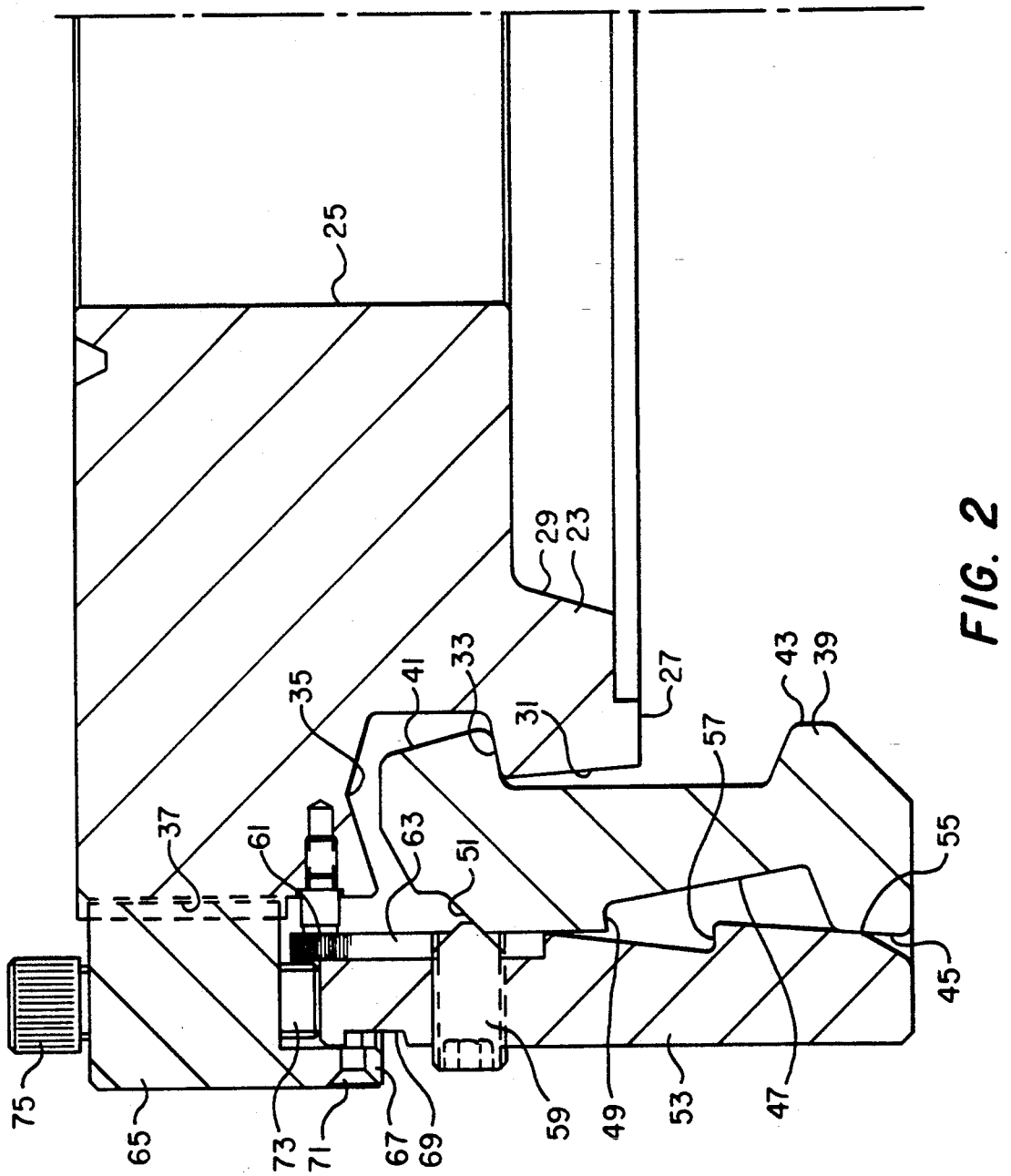
FIG. 2 is an enlarged quarter sectional view of the wellhead connector of FIG. 1, showing the wellhead connector in the locked position.

Referring now to FIG. 2, each dog ring segment 39 has on its lower end an external locking taper surface 45. Locking taper surface 45 is a conical surface at a small angle relative to vertical when dog ring segments 39 are in the locked position. An external recess 47 extends above locking taper surface 45. A downward facing retaining shoulder 49 locates at the upper end of external recess 47. A release shoulder 51 is located a selected distance above retaining shoulder 49. Release shoulder 51 is a conical exterior surface that is at a substantial angle relative to the axis of hub connector 23, preferably about 45 degrees when the dog ring segments 39 are in the locked position.

An actuator ring 53 is employed to move dog ring segments 39 from the unlocked position shown on the right side of FIG. 1 to the locked position shown on the left side of FIG. 1. Actuator ring 53 is a solid cylindrical member that surrounds the exterior of the dog ring segments 39. Actuator ring 53 has an interior locking taper surface 55 at its lower end. Locking taper surface 55 is conical and at the same angle as the locking taper surface 45 of the dog ring segments 39. Actuator ring 53 has a retaining shoulder 57 that faces upward for engaging retaining shoulder 49 of the dog ring segments 39.

The distance between the lower end of actuator ring 53 and the retaining shoulder 57 is less than the axial extent of recess 47 so as to allow engagement of the retaining shoulders 57 and 49.

A plurality of release pins 59 extend through threaded holes in actuator ring 53. Release pins 59 are located radially relative to the axis of hub connector 23. Release pins 59 are circumferentially spaced around actuator ring 53. Release pins 59 will move between a retracted position, shown in the figures, to an inward extended position in which the inner ends of release pins 59 engage the release shoulder 51. The inner ends of the release pins 59 are shaped conically and at the same 45 degree angle as the release shoulder 51. When rotated inward, release pins 59 will wedge the actuator ring 53 upward relative to the dog ring segments 39.

An antirotation means prevents rotation of actuator ring 53 relative to hub connector 23. The antirotation means includes an antirotation pin 61 that secures into a threaded hole in the exterior of hub connector 23. The head of pin 61 locates in a vertical slot 63 formed in the interior upper side of actuator ring 53. Moving actuator ring 53 from the upper position shown on the right side in FIG. 1 to the lower position shown on the left side of FIG. 1 forces the lower ends of dog ring segments 39 inward to tightly clamp the hub connector 23 to wellhead housing 11.

The drive means for driving the actuator ring 53 upward and downward includes a drive nut 65. Drive nut 65 is a solid annular ring mounted to the threads 37 of hub connector 23. Drive nut 65 will move from the upper position shown on the right side in FIG. 1 to the lower position shown on the left side, preferably in about one-fourth turn. The amount of rotation required is based upon the number of separate threads employed with the multi-start threads 37.

As shown more clearly in FIG. 2, drive nut 65 has a lower skirt 67 depending downward. Skirt 67 encircles an upper edge portion of actuator ring 53. Actuator ring 53 has an external groove 69 extending circumferentially around actuator ring 53 and spaced radially inward from skirt 67. A plurality of retaining pins 71 extend through skirt 67 and into groove 69, serving as an engagement means for engaging drive nut 65 with actuator ring 53. Retaining pins 71 retain the actuator ring 53 with the drive nut 65, and cause the actuator ring 53 to move up and down as the drive nut 65 moves between the upper and lower positions. The protruding end of each retaining pin 71 has a diameter or vertical extent that is much less than the vertical extent of groove 69. This allows the actuator ring 53 some vertical travel relative to the drive nut 65. In the embodiment shown, the vertical extent of the protruding end of each retaining pin 71 is only about one-third the axial extent of groove 69.

The drive means for actuator ring 53 also includes a plurality of load pins 73. Load pins 73 extend axially through the drive nut 65. Each pin 73 engages an upper end of actuator ring 53, and has a head 75 that protrudes above drive nut 65. Load pins 73 are spaced circumferentially around the drive ring 65 and are secured in threaded holes 77 (FIG. 1) in drive nut 65. Load pins 73 will thus move from an upper position out of engagement with the upper end of actuator ring 53, as shown on the right side of FIG. 1, to a lower position bearing against the actuator ring 53, as shown in FIG. 2.

In operation, the connector will be assembled by placing the dog ring segments 39 on the connector shoulders 33. The actuator ring 53 is placed around the exterior of dog ring segments 39, with the retaining shoulders 49 and 57 in engagement, as shown on the right side of FIG. 1. Drive nut 65 will be secured to threads 37, but kept in the upper position as shown in the right side of FIG. 1. Release pins 59 will be retracted. Load pins 73 will be retracted as shown in FIG. 1.

The operator places seal 30 on seat 17. The operator then places the entire assembly on wellhead housing 11, as shown on the right side in FIG. 1. The operator then rotates drive nut 65 from the upper to the lower position, this rotation being one-fourth turn. This rotation causes actuator ring 53 to move downward to an intermediate position (not shown). In this intermediate position, lower projection 43 will be engaging shoulder 21, but not yet in full engagement. Also, in this intermediate position, the upper end of actuator ring 53 will be in abutment with the lower side of drive nut 65 because the load pins 73 will still be retracted. Retaining pins 71 will be located at the lower end of groove 69. Drive nut 65 is preferably rotated by inserting a drive bar (not shown) into a hole (not shown) located on the exterior of drive nut 65, then rotating the drive nut 65 by using a leverage of the drive bar.

The operator then utilizes a wrench to tighten each of the load pins 73. As the operator tightens down the load pins 73, the load pins 73 will push the actuator ring 53 downward relative to drive nut 65 and to dog ring segments 39. This downward force tightly wedges the lower projections 43 into engagement with the wellhead housing shoulder 21. The lower ends of the load pins 73 bear against the upper end of the actuator ring 53. The retaining pins 71 may be close to or in contact with the upper end of groove 69 when the actuator ring 53 is in the lower position. The retaining shoulder 57 will be located below retaining shoulder 49. This is the position shown on the left side of FIG. 1. The assembly is now completed. The locking taper of tapered surfaces 45 and 55 prevents any upward movement of actuator ring 53 relative to dog ring segments 39, independently of the retaining force of drive nut 65.

If the operator wishes to release the connector assembly, he will first unscrew the load pins 73. The operator then rotates the release pins 59 inward. Release pins 59 bear against the release shoulders 51. This breaks the locking taper between the tapered surfaces 45, 55, and forces the actuator ring 53 upward a slight distance relative to drive nut 65 and to dog ring segments 39 to the intermediate position. The axial extent of grooves 69 allows this vertical travel. Pins 71 will now locate at the lower end of groove 69 once this wedging action due to release pins 59 has been completed. The operator then rotates drive nut 65 in reverse to move it to the upper position. Retaining pins 71 will cause actuator ring 53 to move straight upward as drive nut 65 is rotated upward. The retaining shoulder 57 will engage retaining shoulder 49 to pull the dog ring segments 39 out from wellhead housing flange 19, as shown in FIG. 2. As actuator ring 53 moves upward, a lower portion of actuator ring 53 will locate in recess 47 of each dog ring segment 39. The operator then can pick up the hub connector 23 and along with it the entire assembly.

The invention has significant advantages. The makeup and breakout procedure is much faster than prior art types. A connector is placed on the wellhead housing and partly connected with just one-fourth turn of a drive nut. Then, only the load screws need to be tightened to lock the connector. No special tools are required.

While the invention has been shown in only one of its forms, it should be apparent to those skilled in the art that it is not so limited, but is susceptible to various changes without departing from the scope of the invention.

I claim:

1. In an apparatus for connecting upper and lower tubular members together, comprising: upper and lower tubular members having upper and lower flanges, respectively, and rims which abut each other, the apparatus including a collet having an upper internal projection which engages the upper flange and a lower internal projection which engages the lower flange, an actuator ring in engagement with the exterior of the collet, drive means for moving the actuator ring axially from an upper position in which the lower internal projection is free to move outward, to a lower position, moving the lower internal projection inward into engagement with the lower flange, the improvement comprising:

a tapered release surface formed on the exterior of the collet; and at least one threaded release pin extending through a threaded hole formed in the actuator ring for engagement with the release surface when the release pin is rotated inward, to pry the actuator ring upward from the lower position when it is desired to release the collet from the lower flange.

2. The apparatus according to claim 1 wherein the release pin extends radially through the actuator ring.

3. The apparatus according to claim 1 wherein:

the collet has an external downward facing retaining shoulder located below the release surface; and the actuator ring has an internal upward facing retaining shoulder located a selected distance below the downward facing retaining shoulder while the actuator ring is in the lower position, and which engages the downward facing retaining shoulder when the collet is in the upper position.

4. The apparatus according to claim 1, wherein the drive means comprises:

a rotatable drive nut secured to external threads formed on the exterior of the upper tubular member for movement between and upper position and a lower position;

engagement means between the drive nut and the actuator ring for causing the actuator ring to move axially in response to axial movement of the drive nut; and antirotation means for preventing rotation of the actuator ring relative to the lower tubular member.

5. The apparatus according to claim 1, wherein the drive means comprises:

a rotatable drive nut secured to external threads formed on the exterior of the upper tubular member for movement between an upper position and a lower position;

engagement means between the drive nut and the actuator ring for causing the actuator ring to move axially in response to axial movement of the drive nut, and for allowing a selected amount of upward movement of the actuator ring relative to the drive nut when the release pin is rotated inward; and antirotation means for preventing rotation of the actuator ring relative to the lower tubular member.

6. The apparatus according to claim 1, wherein the drive means comprises:

a rotatable drive nut secured to external threads formed on the exterior of the upper tubular member for movement between an upper position and a lower position;

engagement means between the drive nut and the actuator ring for causing the actuator ring to move axially in response to axial movement of the drive nut;

a plurality of threaded load pins extending axially through threaded holes in the drive nut into engagement with the actuator ring to move the actuator ring downward relative to the drive nut to the lower position after the drive nut has reached its lower position;

the engagement means allowing a selected amount of downward movement of the actuator ring when the load pins are moved downward, and also allowing a selected amount of upward movement of the actuator ring relative to the drive nut when the release pin is rotated inward after the load pins have been moved upward from engagement with the actuator ring; and antirotation means for preventing rotation of the actuator ring relative to the lower tubular member.

7. The apparatus according to claim 1 wherein the drive means comprises:

a plurality of threaded load pins; and means for supporting the load pins axially on the upper tubular member so as to allow downward movement of the load pins relative to the upper tubular member into engagement with the actuator ring by rotation of the load pins relative to the upper tubular member.

8. In an apparatus for connecting upper and lower tubular members together, comprising: upper and lower tubular members having upper and lower flanges, respectively, and rims which abut each other, the apparatus including a collet having an upper internal projection which engages the upper flange and a lower internal projection which engages the lower flange, an actuator ring in engagement with the exterior of the collet, drive means for moving the actuator ring axially from an upper position in which the lower internal projection is free to move outward, to a lower position, moving the lower internal projection inward into engagement with the lower flange, the drive means comprising:

a rotatable drive nut secured to external threads formed on the exterior of the upper tubular member for movement between an upper position and a lower position;

engagement means between the drive nut and the actuator ring for causing the actuator ring to move axially in response to axial movement of the drive nut; and antirotation means for preventing rotation of the actuator ring relative to the lower tubular member.

9. The apparatus according to claim 8, wherein the engagement means comprises:

an annular groove formed on the exterior of the actuator ring; and at least one retaining projection which locates in the groove and extends inward from the drive nut.

10. The apparatus according to claim 8, further comprising:

a plurality of threaded load pins extending axially through threaded holes in the drive nut into engagement with the actuator ring to move the actuator ring downward relative to the drive nut to the lower position after the drive nut has reached its lower position, the engagement means allowing a selected amount of axial movement relative to the drive nut.

11. The apparatus according to claim 8, wherein the engagement means comprises:
an annular groove formed on the exterior of the actuator ring; and
at least one retaining projection which locates in the groove and extends inward from the drive nut; and wherein the apparatus further comprises:
a plurality of threaded load pins extending axially through threaded holes in the drive nut into engagement with the actuator ring to move the actuator ring downward relative to the drive nut to the lower position after the drive nut has reached its lower position, the groove having a greater axial extent than an axial extent of the retaining pins for allowing a selected amount of axial movement relative to the drive nut.

12. The apparatus according to claim 8, further comprising:
a tapered release surface formed on the exterior of the collet; and
at least one threaded release pin extending through a threaded hole formed in the actuator ring for engagement with the release surface when the release pin is rotated inward, to pry the actuator ring upward from the lower position when it is desired to release the collet from the lower flange.

13. In an apparatus for connecting upper and lower tubular members together, comprising: upper and lower tubular members having upper and lower flanges, respectively, and rims which abut each other, the apparatus including a collet having an upper internal projection which engages the upper flange and a lower internal projection which engages the lower flange, an actuator ring in engagement with the exterior of the collet, drive means for moving the actuator ring axially from an upper position in which the lower internal projection is free to move outward, to a lower position, moving the lower internal projection inward into engagement With the lower flange, the drive means comprising:
a rotatable drive nut secured to external threads formed on the exterior of the upper tubular member for movement between an upper position and a lower position, the drive nut having a depending skirt which extends downward past an upper portion of the actuator ring, defining opposed mating surfaces between said depending skirt and said actuator ring;
an annular groove located in one of the mating surfaces, the groove having an axial extent;
a plurality of retaining pins located in the other of the mating surfaces in engagement with the groove, the retaining pins having an axial extent that is less than the axial extent of the groove, the retaining pins and the groove causing the actuator ring to move axially in response to axial movement of the drive nut, and allowing a selected amount of axial movement of the actuator ring relative to the drive nut;
antirotation means for preventing rotation of the actuator ring relative to the lower tubular member;
a plurality of threaded load pins extending axially through threaded holes in the drive nut into engagement with the actuator ring to move the actuator ring downward relative to the drive nut to the lower position after the drive nut has reached its lower position;
a tapered release surface formed on the exterior of the collet; and
at least one threaded release pin extending through a threaded hole formed in the actuator ring for engagement with the release surface when the release pin is rotated inward, to pry the actuator ring upward from the lower position when it is desired to release the collet from the lower flange.

14. The apparatus according to claim 13, wherein the release pin extends radially through the actuator ring.

15. The apparatus according to claim 13 wherein:
the collet has an external downward facing retaining shoulder located below the release surface; and
the actuator ring has an internal upward facing retaining shoulder located a selected distance below the downward facing retaining shoulder while the actuator ring is in the lower position, and which engages the downward facing retaining shoulder when the collet is in the upper position.

16. A method of connecting together upper and lower tubular members, comprising:
providing the upper and lower tubular members with upper and lower flanges, respectively, and rims which abut each other;
providing a collet with an upper and lower internal projections;
placing an actuator ring in engagement with the exterior of the collet;
securing a drive nut to external threads formed on the exterior of the upper tubular member;
securing a plurality of threaded load pins axially through threaded holes in the drive nut and positioning the load pins in an upper position;
placing the rim of the upper tubular member on the rim of the lower tubular member; then
rotating the drive nut to move the drive nut and the actuator ring downward, while preventing rotation of the actuator ring, causing the lower projections of the collet to move inward into engagement with the lower flange; then
rotating the load pins downward relative to the drive nut, pushing the actuator ring downward relative to the drive nut to a lower position.

17. The method according to claim 16, further comprising:
providing a tapered release surface on the exterior of the collet;
providing at least one threaded release pin extending through a threaded hole formed in the actuator ring; then to release the connection between the upper and lower tubular members,
rotating the load pins upward toward the upper position; then
rotating the release pin inward into engagement with the release surface to pry the actuator ring upward from the lower position; then
rotating the drive nut upward, drawing the actuator ring upward, and allowing the lower projections of the collet to spring outward.

* * * * *

UNITED STATES PATENT AND TRADEMARK OFFICE
CERTIFICATE OF CORRECTION

PATENT NO. : 5,282,655
DATED : February 1, 1994
INVENTOR(S) : Dale B. Marietta

It is certified that error appears in the above-indentified patent and that said Letters Patent is hereby corrected as shown below:

At column 6, line 61, "Which" should be --which--;

At column 7, line 42, "With" should be --with--.

Signed and Sealed this

Twenty-third Day of August, 1994

Attest:

BRUCE LEHMAN

Attesting Officer

Commissioner of Patents and Trademarks